United States Patent
Yoshida

(10) Patent No.: US 7,809,201 B2
(45) Date of Patent: Oct. 5, 2010

(54) IMAGE PROCESSING APPARATUS, IMAGE PROCESSING METHOD AND IMAGE PROCESSING PROGRAM THAT PERFORMS A LEVEL CONVERSION ON MULTILEVEL INPUT IMAGE DATA

(75) Inventor: Yasunari Yoshida, Ama-gun (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1407 days.

(21) Appl. No.: 10/948,294

(22) Filed: Sep. 24, 2004

(65) Prior Publication Data
US 2005/0068554 A1  Mar. 31, 2005

(30) Foreign Application Priority Data
Sep. 26, 2003  (JP) .............................. 2003-335998

(51) Int. Cl.
G06K 9/36 (2006.01)
G06K 9/46 (2006.01)
G06K 15/02 (2006.01)
G06K 15/00 (2006.01)
G06F 3/12 (2006.01)
H04N 1/405 (2006.01)
H04N 1/40 (2006.01)
H04N 1/46 (2006.01)

(52) U.S. Cl. ............ 382/237; 358/3.13; 358/3.14; 358/3.23; 358/1.2; 358/1.13; 358/534

(58) Field of Classification Search ............ 382/237; 358/3.13, 3.14, 1.9, 3.03, 3.23, 1.2, 534, 358/1.13

See application file for complete search history.

(56) References Cited

U.S. PATENT DOCUMENTS

| 4,866,534 A | * | 9/1989 | Tada ............... 358/3.07 |
| 5,424,854 A | * | 6/1995 | Hashimoto ............ 358/3.17 |
| 5,592,592 A | | 1/1997 | Shu |
| 5,638,187 A | * | 6/1997 | Cariffe ............ 358/3.17 |
| 5,661,570 A | | 8/1997 | Nomura |
| 5,692,109 A | | 11/1997 | Shu |
| 5,815,286 A | * | 9/1998 | Matsuba et al. ........ 358/3.19 |
| 5,953,459 A | * | 9/1999 | Ueda et al. ............ 382/237 |
| 6,389,172 B1 | | 5/2002 | Miyazawa |
| 2003/0072035 A1 | | 4/2003 | Hagai et al. |

FOREIGN PATENT DOCUMENTS

| JP | A-8-228287 | 9/1996 |
| JP | A-10-70656 | 3/1998 |
| JP | A-11-146203 | 5/1999 |
| JP | A-11-254663 | 9/1999 |
| JP | A-2000-295474 | 10/2000 |

* cited by examiner

Primary Examiner—Bhavesh M Mehta
Assistant Examiner—Bernard Krasnic
(74) Attorney, Agent, or Firm—Oliff & Berridge, PLC

(57) ABSTRACT

An image processing apparatus includes a determining device, a mode setting device, a storage device, and a dither matrix selecting device that selects a dither matrix corresponding to the one of the plurality of image output modes set by the mode setting device as a dither matrix used by the determining device, wherein when a predetermined image output mode is set by the mode setting device, the dither matrix selecting device selects a dither matrix for higher levels than those of the input image data.

6 Claims, 16 Drawing Sheets

FIG.6

| SUBJECT PIXEL LOCATION X IN MAIN SCANNING DIRECTION | PIXEL DENSITY I | MODIFIED DENSITY I' | THRESHOLD VALUE | OUTPUT DOT | OUTPUT IMAGE U | OUTPUT DENSITY U' | BINARY CONVERSION ERROR e |
|---|---|---|---|---|---|---|---|
| 0 | 255 | | | | | | 0 |
| 1 | 255 | 255 | 128 | ● | 1 | 510 | -255 |
| 2 | 255 | 0 | 128 | × | 0 | 0 | 0 |
| 3 | 255 | 255 | 128 | ● | 1 | 510 | -255 |
| 4 | 255 | 0 | 128 | × | 0 | 0 | 0 |
| 5 | 255 | 255 | 128 | ● | 1 | 510 | -255 |
| 6 | 255 | 0 | 128 | × | 0 | 0 | 0 |
| 7 | 255 | 255 | 128 | ● | 1 | 510 | -255 |
| | | 0 | 128 | × | 0 | 0 | 0 |

FIG.7

| 1/1 | * |
|---|---|

FIG.8  RELATED ART

| SUBJECT PIXEL LOCATION x IN MAIN SCANNING DIRECTION | PIXEL DENSITY I | CONVERSION PIXEL DENSITY I/2 | MODIFIED DENSITY I' | THRESHOLD VALUE | OUTPUT DOT | OUTPUT IMAGE U | BINARY CONVERSION e |
|---|---|---|---|---|---|---|---|
| 0 | 255 | 127 | 127 | 64 | ● | 1 | 0 |
| 1 | 255 | 127 | −1 | 64 | × | 0 | −128 |
| 2 | 255 | 127 | 126 | 64 | ● | 1 | −1 |
| 3 | 255 | 127 | −2 | 64 | × | 0 | −129 |
| 4 | 255 | 127 | 125 | 64 | ● | 1 | −2 |
| 5 | 255 | 127 | −3 | 64 | × | 0 | −130 |
| 6 | 255 | 127 | 124 | 64 | ● | 1 | −3 |
| 7 | 255 | 127 | −4 | 64 | × | 0 | −131 |
|   |     |     |     |    |   |   | −4 |

FIG. 15

| 1 | 9 | 3 | 11 |
|---|---|---|---|
| 13 | 5 | 15 | 7 |
| 4 | 12 | 2 | 10 |
| 16 | 8 | 14 | 6 |

| 1 | 17 | 5 | 21 |
|---|---|---|---|
| 25 | 9 | 29 | 13 |
| 7 | 23 | 3 | 19 |
| 31 | 15 | 27 | 11 |
| 2 | 18 | 6 | 22 |
| 26 | 10 | 30 | 14 |
| 8 | 24 | 4 | 20 |
| 32 | 16 | 28 | 12 |

~235

IMAGE PROCESSING APPARATUS, IMAGE PROCESSING METHOD AND IMAGE PROCESSING PROGRAM THAT PERFORMS A LEVEL CONVERSION ON MULTILEVEL INPUT IMAGE DATA

CROSS-REFERENCE TO RELATED APPLICATION

This application claims priority from JP 2003-335998 filed on Sep. 26, 2003, the subject matter of which is incorporated herein in its entirety by reference thereto.

BACKGROUND OF THE INVENTION

1. Field of Invention

The invention relates to a technique to perform a level conversion on multilevel input image data to produce multilevel output image data having fewer levels than the multilevel input image data.

2. Description of Related Art

Conventionally, error diffusion is known as one technique to convert multi-level input image data into multilevel output image data having fewer levels than multilevel input image data. In this technique, error values generated in a level conversion process are saved with respect to respective pixels of the input image data. The error values are collected based on the error diffusion matrix, and fed back to input level values of unprocessed pixels. By providing feedback of the error values, reproductivity of density levels as an entire image can be improved.

In addition to the error diffusion method, dithering is one of the techniques also frequently used to convert multilevel input image data into multilevel output image data. Dithering is a technique that determines an output level value by comparing an input level value and a threshold value in a dither matrix one-on-one. The dithering technique can also improve the processing speed.

Some techniques to solve defects of error diffusion and dithering have been proposed. For example, U.S. patent application Publication No. 2003/0072035 discloses that an error utilization factor K is determined based on characteristics of input image data and output conditions, such as a printing resolution. The error utilization factor K is multiplied by an error value collected in an error distribution matrix, and then added to the input level value.

SUMMARY OF THE INVENTION

To generate an output image data of high resolution, the pixel size of the output image is reduced and a ratio of a dot size to the pixel size is increased. Thus, there is a problem that the density of an image formed on a recording medium, such as a sheet, becomes thick. Furthermore, when dots are outputted onto a sheet at high density, bleeding, drips of ink, or cockling of the sheet are likely to occur.

The invention provides a technique to make the density of an entire image represented by output image data appropriate.

According to one exemplary aspect of the invention, an image processing apparatus converts multilevel input image data into multilevel output image data having fewer levels than the multilevel input image data and used in an image output device. The image processing apparatus includes a modifying device that modifies an input level value of a subject pixel in the input image data with use of an error value generated by a level conversion as to a pixel close to the subject pixel and calculates a modified level value of the subject pixel; a determining device that determines an output level value of the subject pixel in the output image data based on a comparison between the modified level value of the subject pixel and a threshold value; an error value calculating device that calculates the error value for the subject pixel from a difference between the output level value of the subject pixel and the modified level value of the subject pixel; a mode setting device that adjusts the image output device to operate in one of a plurality of image output modes each of which outputs output image data at a different resolution; and an output level value setting device that sets the output level value used by the error value calculating device to a value corresponding to the one image output mode set by the mode setting device. When a predetermined image output mode is set by the mode setting device, the output level value setting device sets the output level value used by the error value calculating device to a value greater than the output level value when other image output mode is set.

According to another exemplary aspect of the invention, the image processing apparatus includes a mode setting device that adjusts the image output device to operate in one of a plurality of image output modes each of which outputs output image data at a different size ratio of a dot size to a pixel size of an output image. When a predetermined image output mode is set by the mode setting device, the output level value setting device sets the output level value used by the error value calculating device to a value greater than the output level value when other image output mode is set.

According to a further exemplary aspect of the invention, the image processing apparatus includes a determining device that determines an output level value of a subject pixel in the output image data based on a comparison between an input level value of the subject pixel in the input image data and a threshold value corresponding to the subject pixel in a dither matrix; a mode setting device that adjusts the image output device to operate in one of a plurality of image output modes each of which outputs output image data at a different resolution; a storage device that stores a plurality of dither matrices of varying ranges according to representable levels in association with the plurality of image output modes; and a dither matrix selecting device that selects a dither matrix corresponding to the one image output mode set by the mode setting device as a dither matrix used by the determining device. When a predetermined image output mode is set by the mode setting device, the dither matrix selecting device selects a dither matrix for higher levels than those of the input image data.

According to one exemplary aspect of the invention, the image processing apparatus includes a mode setting device that adjusts the image output device to operate in one of a plurality of image output modes each of outputs output image data at a different size ratio of a dot size to a pixel size of an output image. When a predetermined image output mode is set by the mode setting device, the dither matrix selecting device selects a dither matrix for higher levels than those of the input image data.

According to another exemplary aspect of the invention, there is provided an image processing method of converting multilevel input image data into multilevel output image data having fewer levels than the multilevel input image data. The image processing method includes modifying an input level value of a subject pixel in the input image data with use of an error value generated by a level conversion as to a pixel close to the subject pixel and calculating a modified level value of the subject pixel; determining an output level value of the subject pixel in the output image data based on a comparison between the modified level value of the subject pixel and a threshold value; calculating the error value for the subject pixel from a difference between the modified level value of the subject pixel and the output level value thereof; setting the output level value used to calculate the error value to a value corresponding to a resolution of the output image data when the output image data is outputted at the resolution selected from a plurality of resolutions; and setting the output level value to a value greater than the output level value at an other resolution, if the output image data is outputted at a predetermined resolution of the plurality of resolutions.

According to a further exemplary aspect of the invention, the image processing method includes setting the output level value used to calculate the error value to a value corresponding to a size ratio of a dot to a pixel of the output image data when the output image data is outputted at the size ratio selected from a plurality of size ratios; and setting the output level value to a value greater than the output level value at an other size ratio, if the output image data is outputted at a predetermined size ratio of the plurality of size ratios.

According to another exemplary aspect of the invention, the image processing method includes comparing an input level value of a subject pixel in the input image data and a threshold value corresponding to the subject pixel in a dither matrix; determining an output level value of the subject pixel in the output image data based on a result of the step of comparing; selecting a dither matrix corresponding to a resolution of the output image data as a dither matrix used to determine the output level value when the output image data is outputted at the resolution selected from a plurality of resolutions; and selecting a dither matrix for higher levels than those of the input image data if the output image data is outputted at a predetermined resolution of the plurality of resolutions.

According to another exemplary aspect of the invention, the image processing method includes selecting a dither matrix corresponding to a size ratio of a dot to a pixel of the output image data as a dither matrix used to determine the output level value when the output image data is outputted at the size ratio selected from a plurality of size ratios of dots to pixels of an output image; and selecting a dither matrix for higher levels than those of the input image data if the output image data is outputted at a predetermined size ratio of the plurality of size ratio.

According to a further exemplary aspect of the invention, there is provided an image processing program configured to operate a computer to convert multilevel input image data into multilevel output image data having fewer levels than the multilevel input image data. The image processing program comprising instructions to modify an input level value of a subject pixel in the input image data with use of an error value generated by a level conversion as to a pixel close to the subject pixel and calculate a modified level value of the subject pixel; determine an output level value of the subject pixel in the output image data based on a comparison between the modified level value of the subject pixel and a threshold value; calculate the error value for the subject pixel from a difference by subtracting the output level value of the subject pixel from the modified level value of the subject pixel; and set the output level value used to calculate the error value to a value corresponding to a resolution of the output image data when the output image data is outputted at the resolution selected from a plurality of resolutions, to a greater value compared with the output level value at an other resolution.

According to a further exemplary aspect of the invention, the image processing program comprising instructions to set the output level value used to calculate the error value to a value corresponding to a size ratio of a dot to a pixel of the output image data when the output image data is outputted at the size ratio selected from a plurality of size ratios, to a greater value compared with the output level value at an other size ratio, if the output image data is outputted at a predetermined size ratio of the plurality of size ratios.

According to one exemplary aspect of the invention, there is provided an image processing program configured to operate a computer to convert multilevel input image data into multilevel output image data having fewer levels than the multilevel input image data. The image processing program comprising instructions to determine an output level value of a subject pixel in the output image data based on a comparison between an input level value of the subject pixel in the input image data and a threshold value corresponding to the subject pixel in a dither matrix; and select a dither matrix corresponding to a resolution of the output image data as a dither matrix used to determine the output level value when the output image data is outputted at a resolution selected from a plurality of resolutions, for higher levels than those of the input image data if the output image data is outputted at a predetermined resolution of the plurality of resolutions.

According to another exemplary aspect of the invention, the image processing program comprising instructions to select a dither matrix corresponding to a size ratio of a dot to a pixel of the output image data as a dither matrix used to determine the output level value when the output image data is outputted at the size ratio selected from a plurality of size ratios, for higher levels than those of the input image data if the output image data is outputted at a predetermined size ratio of the plurality of size ratios.

BRIEF DESCRIPTION OF THE DRAWINGS

An embodiment of the invention will be described in detail with reference to the following figures, wherein:

FIG. 6 is a table showing results of binarization of input image data with the maximum density;

FIG. 7 is an illustration of an error distribution matrix;

FIG. 8 is a table showing results for calculating a modified density using a value, which is set to a half of a pixel density;

FIG. 15 is an illustration of a dither matrix for low resolution;

FIG. 16 is an illustration of a dither matrix for high resolution;

DETAILED DESCRIPTION OF PREFERRED EMBODIMENTS

An exemplary embodiment of the invention will be described in detail with reference to the accompanying drawings.

Figure 1:
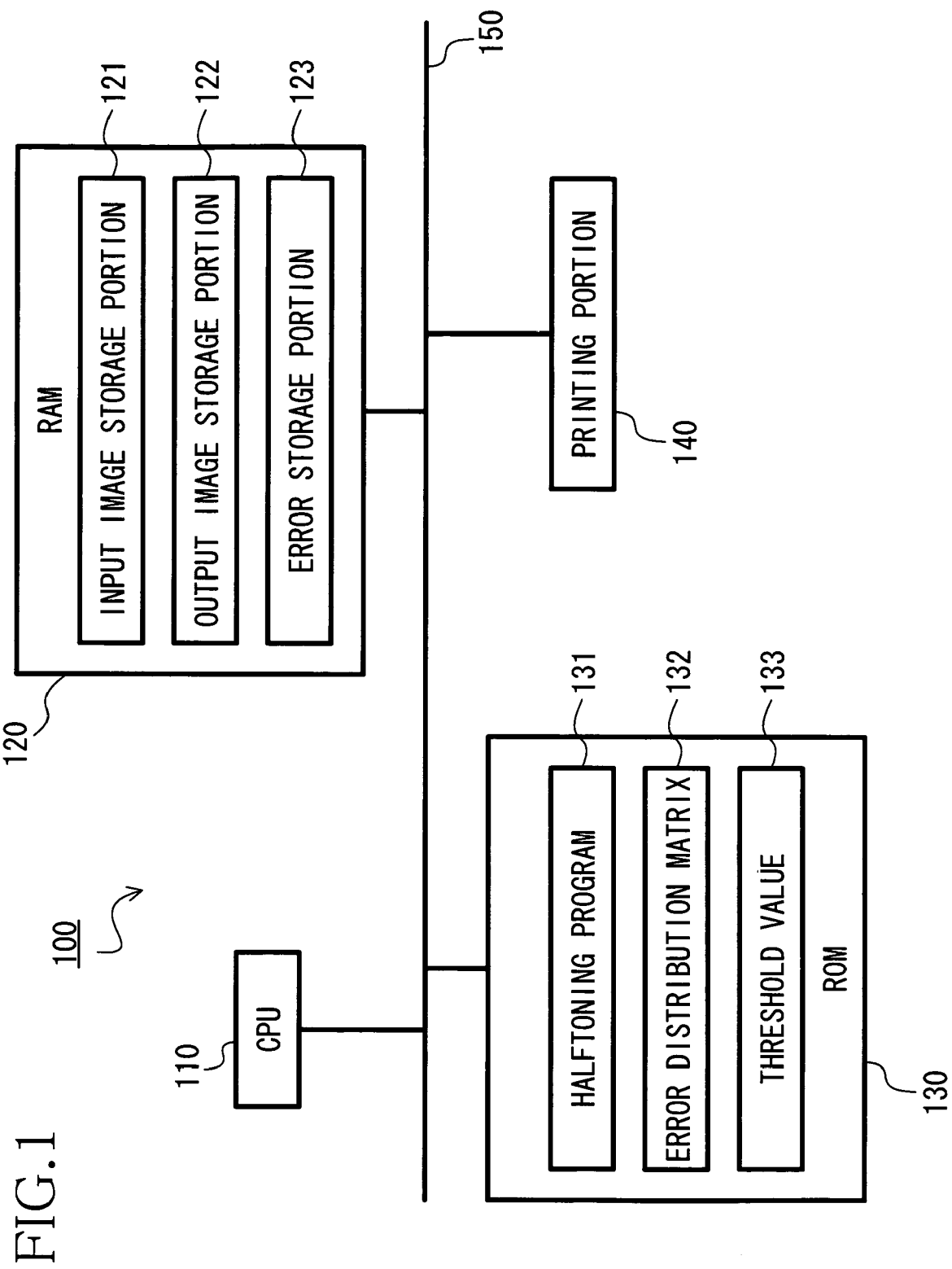
FIG. 1 is a block diagram of a general structure of a printer according to a first exemplary embodiment of the invention.

FIG. 1 is a block diagram representing a general structure of a printer 100 as an image processing apparatus in a first exemplary embodiment of the invention.

The printer 100 has a function to produce pseudo-halftone output image data by binarizing two hundred fifty six (256) levels of input image data (a multilevel ranging from zero (0) to two hundred fifty five (255). The printer 100 is provided with a CPU 110, a RAM 120, a ROM 130, and a printing portion 140, which are connected via a bus 150 to enable data communications therebetween, as shown in FIG. 1.

The RAM 120 is provided with an input image storage portion 121 for storing input image data, an output image data storage portion 122 for storing output image data, and an error storage portion 123 for storing a binary conversion error e generated by the binarization process.

The input image data refers to four kinds of input image data, namely, black (K) image data, cyan (C) image data, magenta (M) image data and yellow (Y) image data, which correspond to respective print colors for printing a color image. The printer 100 generates output image data of each print color corresponding to the input image data of each color. An image of each print color generated based on each of the output image data is printed on a recording sheet so as to overlap each other, so that a color image is represented.

The ROM 130 stores a halftoning program (which functions as an image processing program) 131 that allows the CPU 110 to execute halftoning (FIG. 3) to generate output image data, which is obtained by binarizing 256 levels of input image data using error diffusion.

The ROM 130 also stores an error distribution matrix 132 and a fixed threshold value 133 (the fixed threshold value is "128" in the first exemplary embodiment) as information used in the halftoning.

The printing portion 140 ejects each of color inks of black (K), cyan (C), magenta (M), and yellow (Y) (which functions as a coloring agent) and forms dots on a sheet of paper (which functions as a recording medium), so that a color image represented by the output image data is printed thereon.

In the printer 100, a print mode (which functions as an image output mode) can be selectable between a high-resolution mode for printing a high resolution output image and a low-resolution mode for printing a low resolution output image. The printer 100 generates output image data having a resolution corresponding to the print mode being set. In the low-resolution mode, the printer 100 forms dots of size shown in FIG. 2A, for example, as to a pixel size of the output image at the printing portion 140.

Figure 2B:
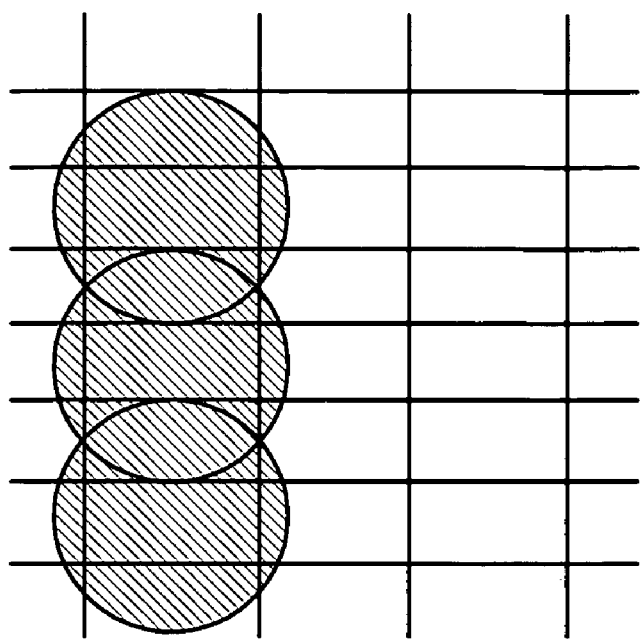
FIGS. 2A and 2B show relationships between pixel size and dot size.
Figure 2A:
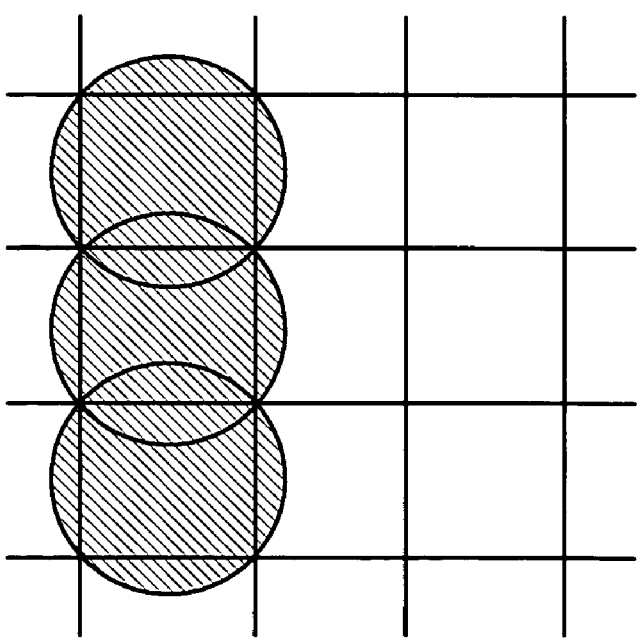

In the high-resolution mode, the pixel size of the output image is smaller than that in the low-resolution mode, and thus the ratio of the dot size to the pixel size becomes great. Specifically, in the high-resolution mode where the pixel size of the output image is half as large as that in the low-resolution mode, when dots are recorded in 50% of all pixels of the output image, the results become equal to those when dots are recorded in 100% pixels of the output image in the low-resolution mode, as shown in FIG. 2B. In other words, with respect to the pixel size of the output image, the dot size relatively becomes approximately twice as large as that in the low-resolution mode.

Figure 3:
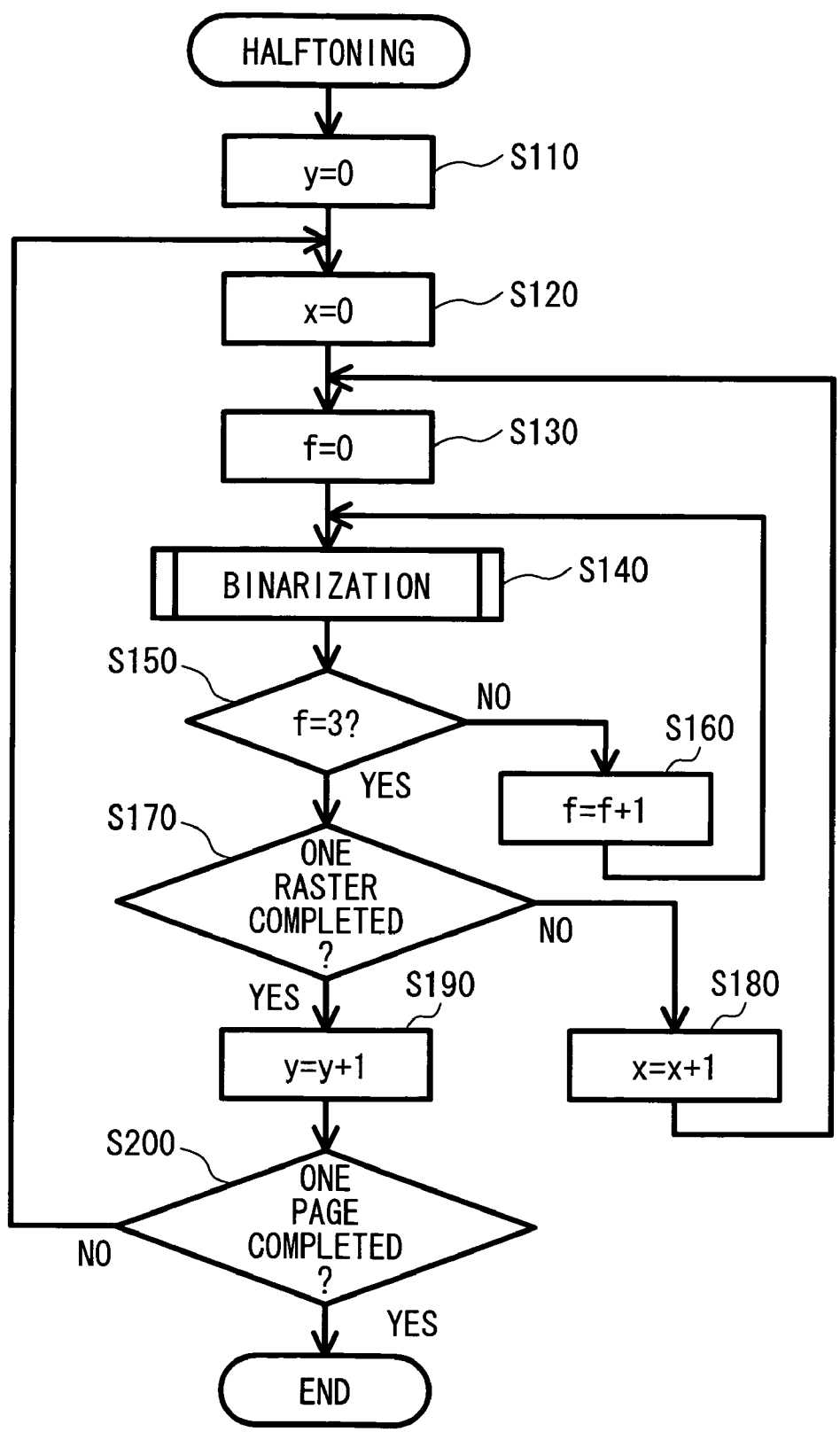
FIG. 3 is a flowchart of halftoning according to the first exemplary embodiment of the invention.

The halftoning process to be executed by the CPU 110 in accordance with the halftoning program 131 stored in the ROM 130 will be described with reference to FIG. 3. At the start of the halftoning process, the error storage portion 123 is initialized to zero (0). When the halftoning process starts, values of variables x and y are set to zero (0), which is an initial value, at S110 and S120 respectively (S represents a single step). The variables x and y are used to determine a location of a pixel to be subjected to a binarization process, i.e., the location of a subject pixel.

At S130, a value of a variable f is set to zero (0). The variable f is used to determine a print color of input image data to be processed. Values of the variable f are 0 for black (K), 1 for cyan (C), 2 for magenta (M), and 3 for yellow (Y).

At S140, a binarization process is executed for input image data whose print color is represented by the variable f, of input image data sets stored in the input image storage portion 121. In the binarization process, the subject pixel (x, y) in the input image data is binarized to determine a corresponding output image U (which functions as an output level value). The binarization process will be described later in detail.

At S150, it is determined whether the value of the variable f reaches 3. If it is determined that the value of the variable f does not reach 3 (the variable f is any number from 0 to 2), the flow goes to S160, and one (1) is added to the value of the variable f to change the print color of the input image data to be binarized, and then the flow returns to S140.

On the other hand, when it is determined that the value of the variable f reaches 3, the flow goes to S170. That is, the flow is designed to go to S170 after the binarization process (S140) as to the input image data for each print color. At S170, it is determined whether a binarization for one raster (one line) has been completed. That is, it is determined whether a binarization in the main scanning direction (x direction) has been completed.

When it is determined that the binarization for one raster is not completed at S170, the flow goes to S180, and one (1) is added to the value of the variable x to move the subject pixel position x, by one pixel (or column), in the main scanning direction. The flow returns to S130 and the steps subsequent to S130 are performed again.

On the other hand, when it is determined that the binarization for one raster has been completed at S170, the flow goes to S190, and one (1) is added to the value of the variable y to move the subject pixel position y, by one line, in a sub-scanning direction (in a y-axis direction).

At S200, a determination is made as to whether a binarization for one page has been completed. When it is determined that the binarization for one page has not been completed at S200, the flow returns to S120 and the steps subsequent to S120 are performed again. On the other hand, when it is determined that the binarization for one page has been completed at S200, the halftoning ends. By executing the above-mentioned halftoning, output image data as to each print color is generated in the output image storage portion 122.

Figure 4:
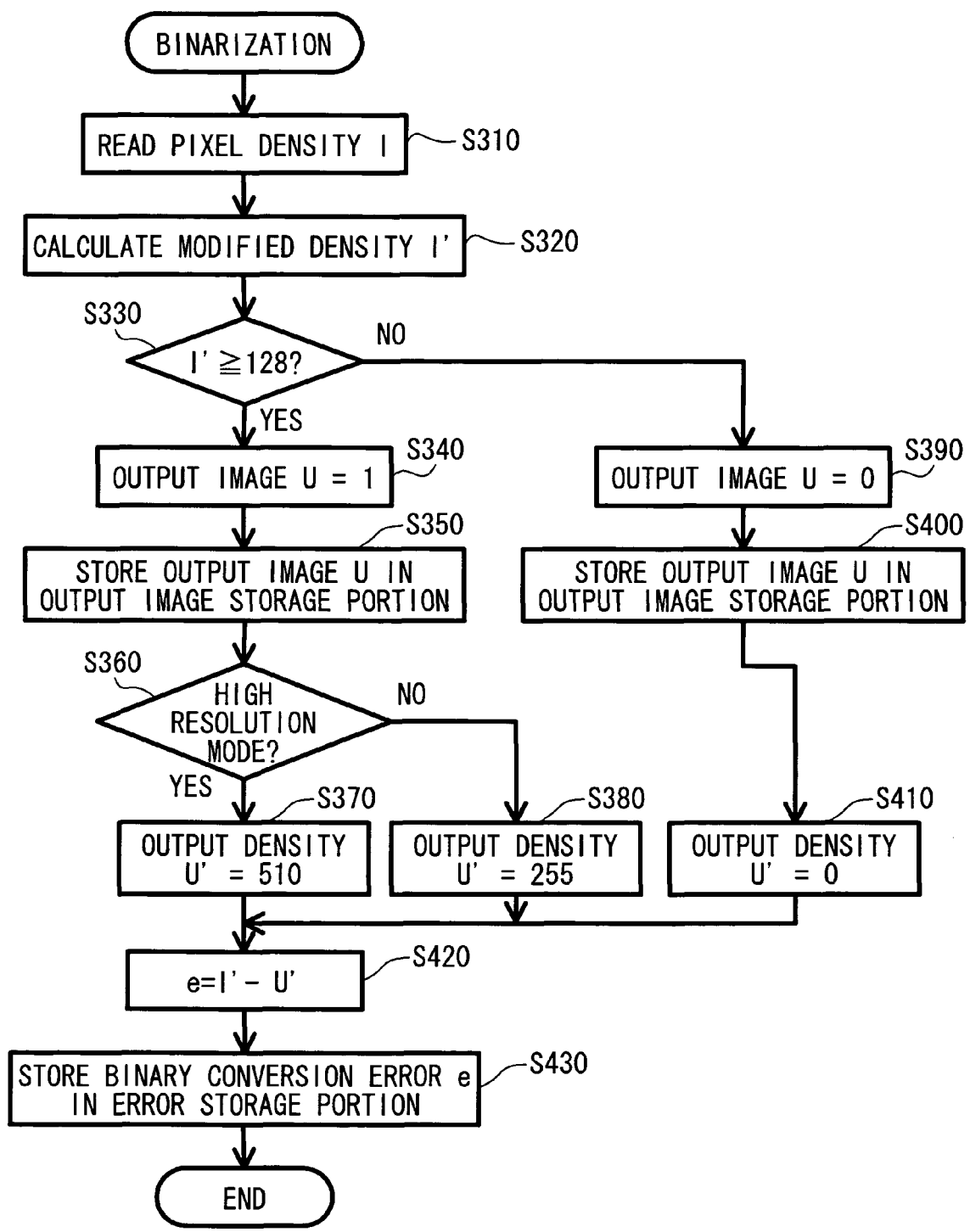
FIG. 4 is a flowchart of a binarization process according to the first exemplary embodiment of the invention.
Figure 5:
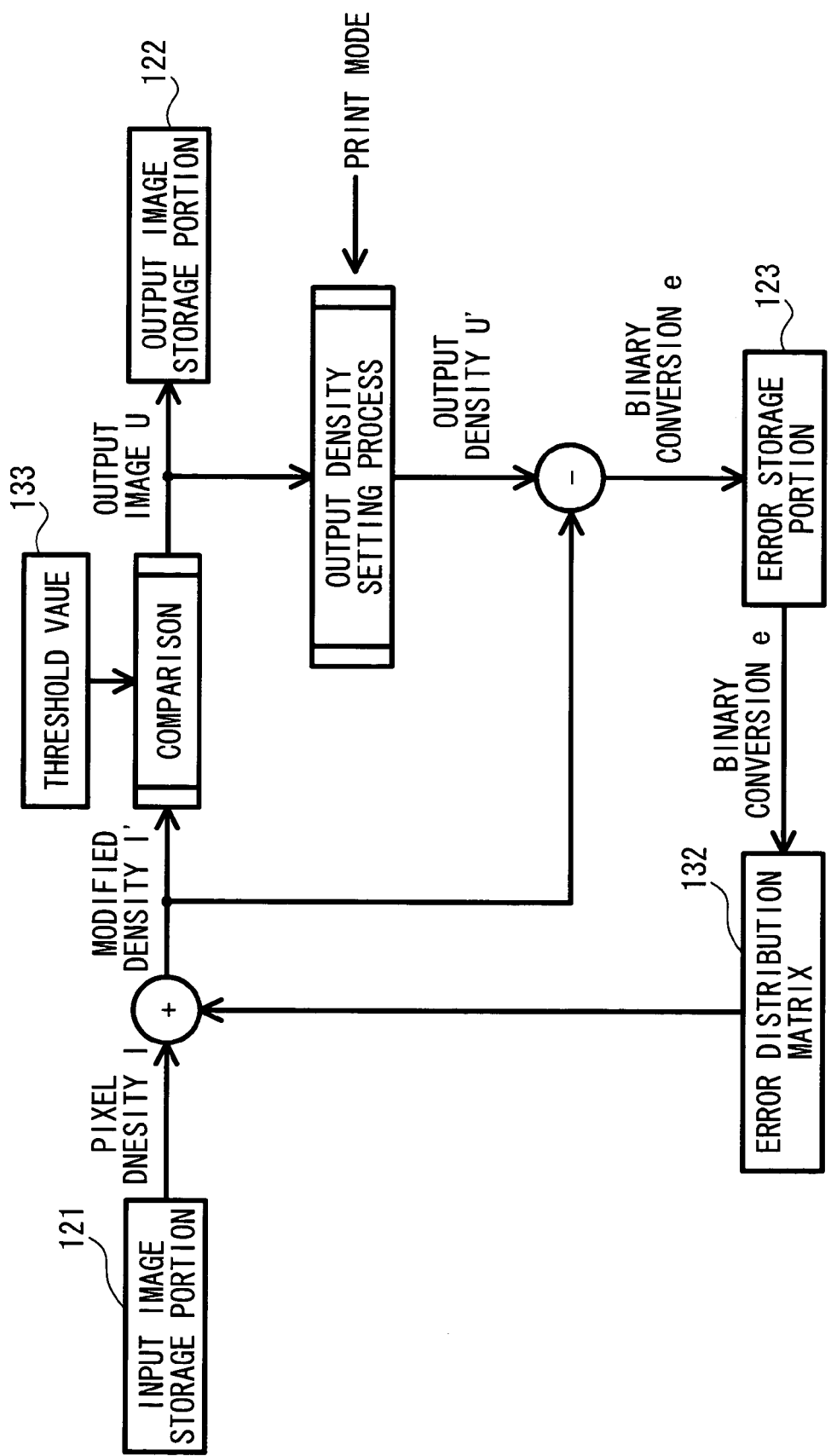
FIG. 5 is a block diagram of the binarization process.

The following is a description of a binarization process executed at S140 of the above halftoning with reference to FIGS. 4 and 5. The binarization process in this exemplary embodiment is different from the conventional method in that a binary conversion error e is calculated in a different way according to whether the print mode of the printer 100 is set to the high-resolution mode or the low-resolution mode.

When the binarization process is started, a pixel density I (which functions as an input level value; $0 \leq I \leq 255$) of the subject pixel (x, y) in the input image data of the print color indicated by the variable f from the input image storage portion 121 at S310 is read. Although this embodiment describes a pixel density I functioning as an input level value, an intensity of a subject pixel may also function as an input level value.

At S320, the pixel density I read at S310 is modified to obtain a modified density I' (which functions as a modified level value), with the addition of binary conversion errors e (which function as an error value), which are distributed to pixels located in the neighborhood of the subject pixel and are stored in the error storage portion 123. More specifically, based on the error distribution matrix 132 stored in the ROM 130, a binary conversion error e for each neighboring pixel whose weight coefficient is set with respect to the subject pixel, and a weight coefficient corresponding to each neighboring pixel, are multiplied together, and the sum is added to the pixel density I, thereby calculating the modified density I', as shown in the following Expression 1:

$$I'=I+\Sigma(e_{ij}\times \text{weight coefficient}_{ij}) \quad \text{[Expression 1]}$$

where ij indicates a relative position relative to the subject pixel.

At S330, it is determined whether the modified density I' calculated in S320 is greater than or equal to a threshold value 133 (fixed value is "128") stored in the ROM 130.

When it is determined that the modified density I' is greater than or equal to the threshold value at S330, the flow goes to S340, the output image U of the print color represented by the variable f as to the subject pixel (x, y) is set to 1, and a value for the output image U is stored in the output image storage portion 122 at S350. The output image U=1 corresponds to 255 in 256 levels (from 0 to 255), and output image U=0 corresponds to zero (0) in 256 levels.

At S360, a determination is made as to whether the print mode of the printer 100 is set to the high-resolution mode. When it is determined that the print mode is set to the high-resolution mode at S360, the flow goes to S370, and an output density U', which is a value of the output image U for calculation of the binary conversion error e, is set to 510. Then, the flow goes to S420.

On the other hand, when it is determined that the print mode is not set to the high-resolution mode at S360 (namely, the print mode is set to the low-resolution mode), the flow goes to S380, and the output density U' is set to 255. Then, the flow goes to S420.

At S330, when it is determined that the modified density I' is not greater than or equal to the threshold value (that is, it is under the threshold value), the flow goes to S390, the output image U for a print color represented by the variable f as to the subject pixel (x, y) is set to zero (0). At S400, the value for the output image U is stored in the output image storage portion 122.

The output density U' is set to zero at S410, and then the flow goes to S420. The output density U' may be calculated from the output image U. At S420, the binary conversion error e (the value for a print color represented by the variable f) generated during the binarization process is calculated by subtracting the output density U' set at S370, S380, or S410 from the modified density I' obtained at S320, as shown in the following Expression 2:

$$e=I'-U' \quad \text{[Expression 2]}$$

Then, at S430, the calculated binary conversion error e is stored in the error storage portion 123 as a binary conversion error e as to the pixel (x, y) (the value for a print color represented by the variable f), and the binarization process has been completed.

The following description is the binarization process when the print mode of the printer 100 is set to the high-resolution mode and input image data having the maximum density (i.e., a solid black image) is binarized, with reference to FIG. 6. To make the description simple, the description will be made using a simple error distribution matrix as shown in FIG. 7 (with "*" representing the subject pixel and "1/1" representing the weight coefficient). However, the usable error distribution matrix is not limited to the matrix as shown in FIG. 7. Various error distribution matrices in size may be used.

As shown in FIG. 6, the following process is performed as a process for the subject pixel when the subject pixel location x in the main scanning direction is zero (0). The pixel density I=255 of the subject pixel is read from the input image data (S310).

From the sum of the pixel density I and a binary conversion error e (e=0 in this case) as to a neighboring pixel indicated by the error diffusion matrix (FIG. 7) (namely, a pixel at a position where 1 is subtracted from the subject pixel location x in the main scanning direction), the modified density I' is calculated at 255 (S320).

The modified density I' and the threshold value (128) are compared. In this case, as the modified density I' is greater than or equal to the threshold value (S330: Yes), the value of the output image U is regarded as 1 (S340), and a dot is outputted at the pixel's location. The output density U' is set to 510 (S370). By subtracting the output density U' from the modified density I', the binary conversion error e is calculated at −255 (S420).

The following process will be made as a process for the subject pixel when the subject pixel location x in the main scanning direction is 1. The pixel density I=255 of the subject pixel is read from the input image data (S310).

From the sum of the pixel density I and the binary conversion error e for the neighboring pixel (−255), the modified density I' is calculated at 0 (S320). The modified density I' and the threshold value (128) are compared. In this case, as the modified density I' is under the threshold value (S330: No), the value of the output image U is regarded as 0 (S390), and no dot is to be outputted at the pixel location.

The output density U' is set to 0 (S410). By subtracting the output density U' from the modified density I', the binary conversion error e is calculated at 0 (S420).

In this way, the process for the subject pixel is performed as the subject pixel location x in the main scanning direction=2, 3, . . . is changed sequentially. Thus, dots are to be outputted for every other pixel.

In the high-resolution mode, when dots are recorded on 50% of all pixels of the output image, the amount of ink capable of being ejected onto a sheet reaches a maximum, so that the output image data commensurate with the resolution of the input image data is to be generated. Because the dot size becomes twice as large as the pixel size of the output image data in the high-resolution mode, compared with the low-resolution mode, the value of the output density U'=510, which is double the value of the output density U'=255 in the low-resolution mode, is used for calculating the binary conversion error e. Then, the input image data and the output image data become equal in the density as an entire image.

In the printer 100, the binary conversion error e is calculated using "output density U'=510", which is a value doubled by the "output density U'=255" in the low-resolution mode, in order to reduce the number of dots of the output image.

However, instead of this technique, the modified density I' can be calculated using a value of half the pixel density I.

Specifically, as shown in FIG. 8, the following procedure will be performed for the subject pixel when the subject pixel location x in the main scanning direction is zero (0). The pixel density I=255 of the subject pixel is read from the input image data.

From the sum of a conversion pixel density I/2=127, which is a value of half the pixel density I, and the binary conversion error e as to a neighboring pixel (in this case, e=0), the modified density I' is calculated at 127.

The modified density I' and the threshold value (sixty four (64) in this case) are compared. Because the modified density I' is greater than or equal to the threshold value, the value of the output image U is regarded as 1, and a dot is outputted at the pixel's location. Then, the output density U'(=255 when the output image U=1) is subtracted from the modified density I'. Thus, the binary conversion error e=−128 is calculated.

The following procedure will be performed for the subject pixel when the subject pixel location x in the main scanning direction is one. The pixel density=255 of the subject pixel is read from the input image data. Then, from the sum of the conversion pixel density I/2=127, which is a value of half the pixel density I, and the binary conversion error e=128 as to a neighboring pixel, the modified density I' is calculated at −1.

The modified density I' and the threshold value (64) are compared. In this case, as the modified density I' is under the threshold value, the value of the output image U is regarded as 0, and any dot is not outputted at the pixel location. Then, the output density U'=0 is subtracted from the modified density I', and the binary conversion error e is calculated at −1. In this way, the process for the subject pixel is performed as the subject pixel location x in the main scanning direction is 2, 3, . . . is changed sequentially. Thus, dots are to be outputted for every other pixel.

However, in the technique shown in FIG. 8, the value of the conversion pixel density I/2, which is half the value of the pixel density I, should be an integer because the computing will be greatly slowed if the value is not integer. For this reason, if the pixel density I is 254, the conversion pixel density I/2 becomes 127, with the result that the output dot precisely identical with that shown in FIG. 8 can be obtained. In other words, although the input image data has 256 levels, the actual processing ends in the same results as when the input image data having 128 levels. Consequently, the technique shown in FIG. 8 substantially reduces the number of levels of the input image data, however, the technique of the printer 100 of the first embodiment (FIG. 6) is free from such a problem.

In the printer 100 of the first exemplary embodiment, the process at S320 in binarization process (FIG. 4) functions as a modifying device, the processes at S330, S340, and S390 function as a determining device, the processes at S360 to S380 function as an output level value setting device, and the process at S420 functions as an error value calculating device.

As described above, in the printer 100 of the first exemplary embodiment, the output density U' used for calculating the binary conversion error e is set to a value corresponding to a ratio of a dot size with respect to the pixel size of the output image. Thus, according to the printer 100, even when the dot size is greater than the pixel size of the output image, the density of the entire image represented by the output image data can be adjusted appropriately. Furthermore, loss of levels of the multilevel input image data can be prevented.

Figure 9:
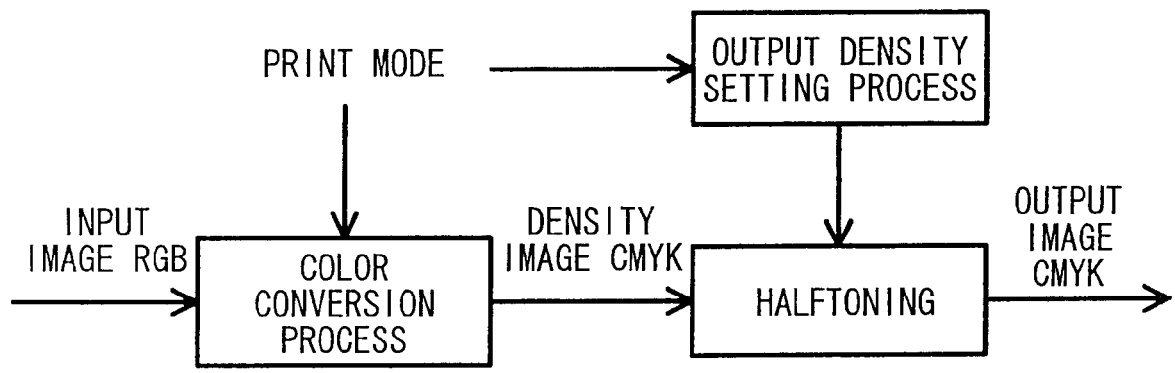

In the printer 100 of the exemplary first embodiment, setting of the output density U' corresponding to the print mode of the printer 100 is performed in the binarization process (S360 to S380 in FIG. 4), which is executed at S140 of halftoning (FIG. 3), however, the invention is not limited to this process. For example, as shown in FIG. 9, a process for setting the output density U' corresponding to the print mode of the printer 100 may be performed aside from a series of processes where a color conversion is applied to the input image data of RGB data to generate a density image of CMYK data and halftoning is applied to generate an output image of the CMYK data.

Figure 10:
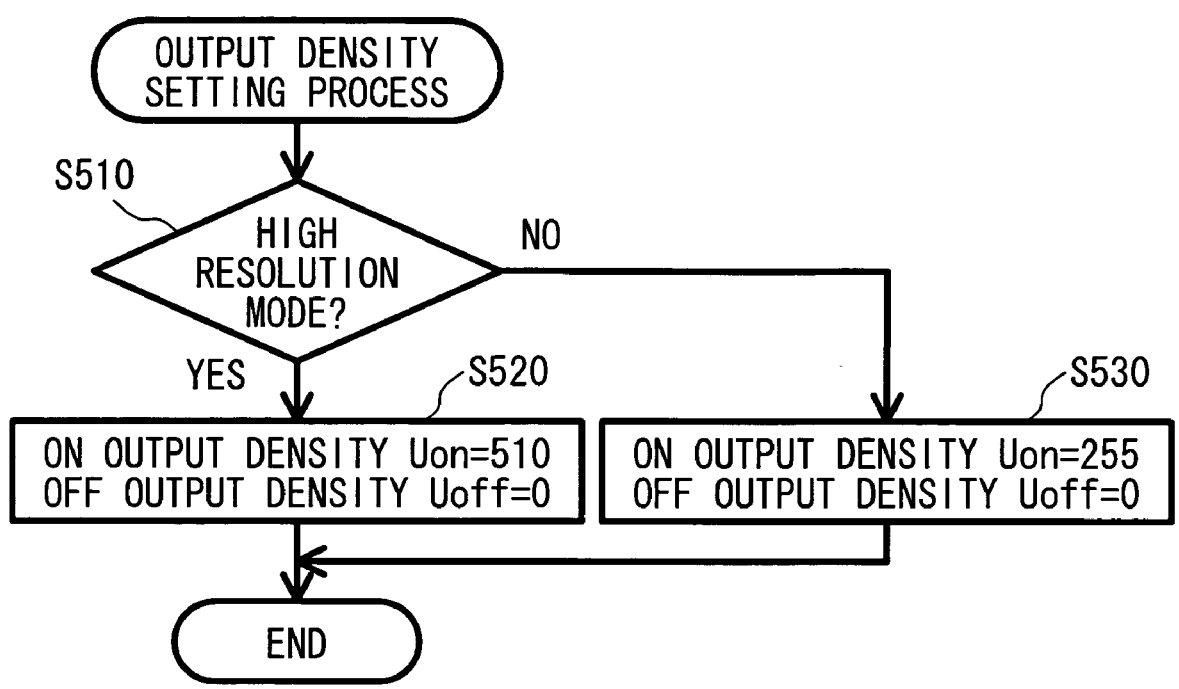
FIG. 10 is a flowchart of the output density setting process.

Examples of the output density setting process and the binarization process executed in halftoning in association with the output density setting process will be described. The output density setting process will be described with reference to a flowchart of FIG. 10. As shown in FIG. 10, when the output density setting process is started, it is determined whether the print mode of the printer 100 is set to the high-resolution mode at S510.

When it is determined that the print mode is set to the high-resolution mode at S510, the flow goes to S520, where an ON output density Uon, which is an output density U' when the value of the output image U is one (1), is set to 510, and an OFF output density Uoff, which is an output density U' when the value of the output image U is zero (0), is set to zero (0), and the output density setting process ends.

On the other hand, when it is determined that the print mode is not set to the high-resolution mode (i.e., the print mode is set to the low-resolution mode) at S510, the flow goes to S530, the ON output density Uon is set to 255, the OFF output density Uoff is set to zero (0), and the output density setting process ends.

Figure 11:
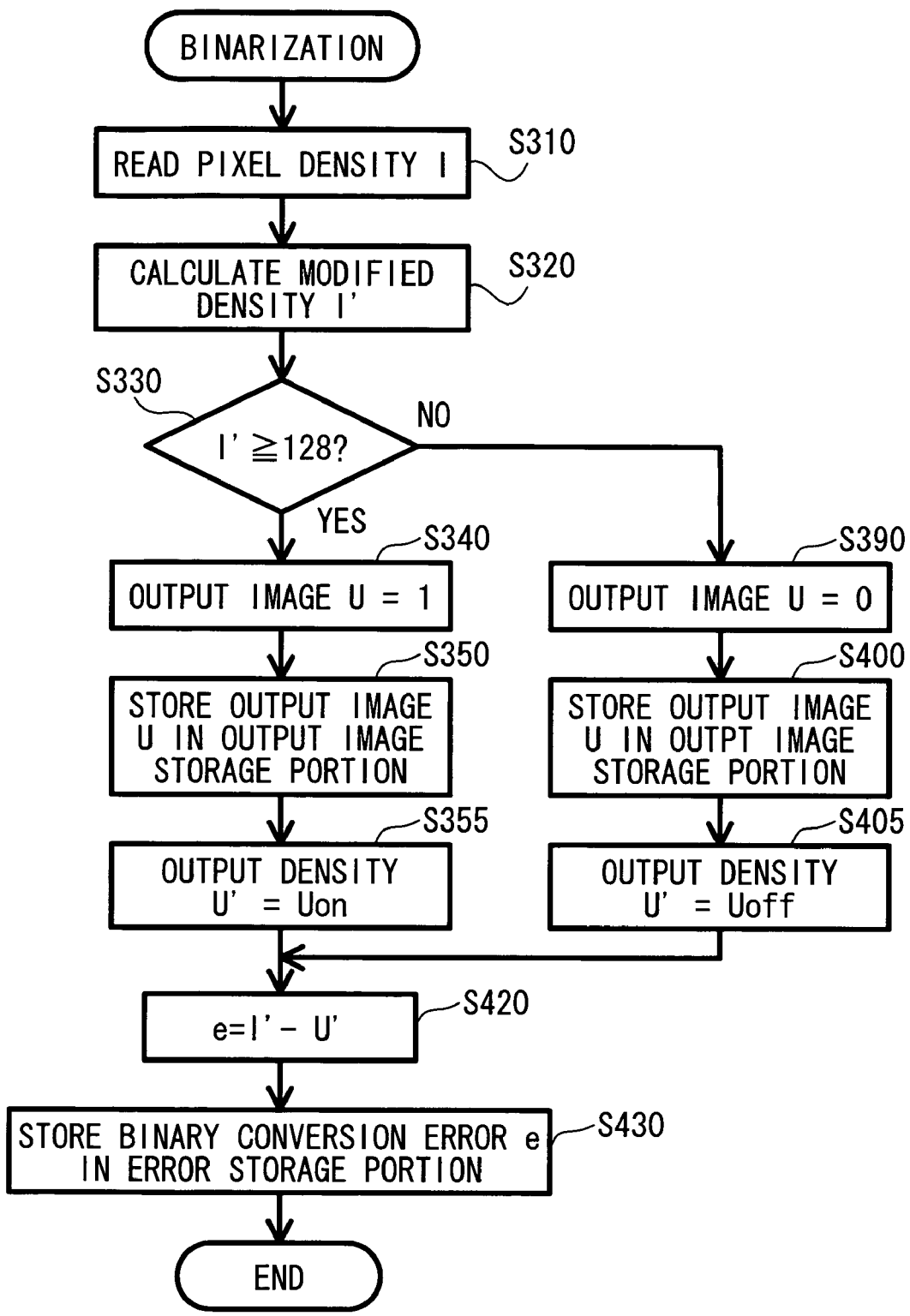
FIG. 11 is a flowchart of a binarization process as a modification.
Figure 12:
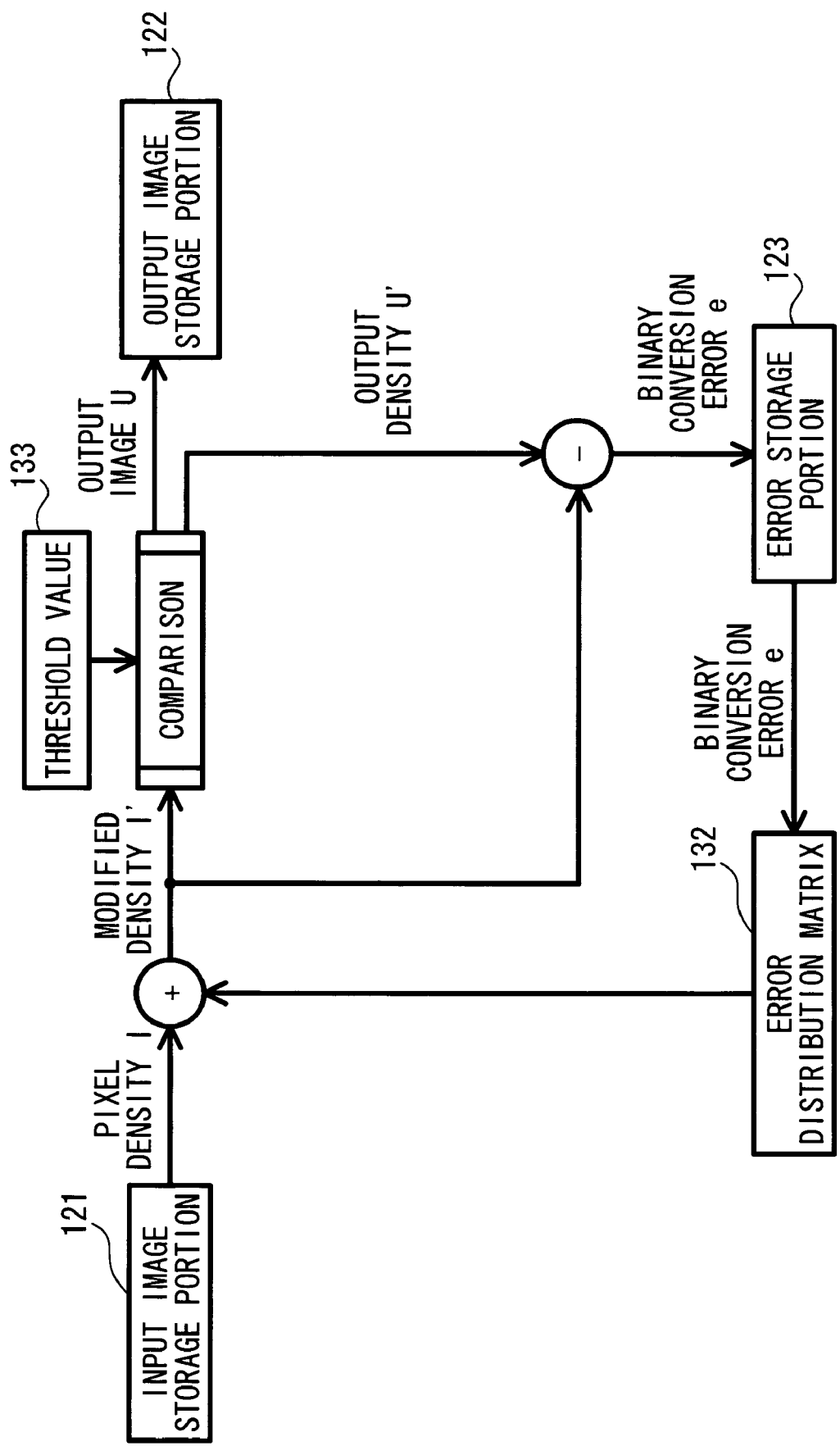
FIG. 12 is a block diagram of the binarization process in the modification.

Next, an exemplary binarization process will be described with reference to a flowchart of FIG. 11 and a block diagram of FIG. 12. In this exemplary embodiment, the process at S355 is performed instead of the processes at S360 to S380 and the process at S405 is performed instead of the process at S410 as discussed above. Similar processes (S310 to 350, S390, S400, S420, and S430) are designated by similar numerals, and thus the description thereof can be omitted for the sake of brevity.

In the binarization, at S355, the output density U' is set to the ON output density Uon which has been set in the above output density setting process (FIG. 10). Thus, when the print mode of the printer 100 is set to the high-resolution mode, the output density U' is set to 510, and when set to the low-resolution mode, the output density U' is set to 255.

At S405, the output density U' is set to the OFF output density Uoff which has been set in the above output density setting process (FIG. 10). Thus, when the print mode of the printer 100 is set to either the high-resolution mode or the low-resolution mode, the output density U' is set to zero (0).

In the above example, the output density setting process (FIG. 10) functions as an output level value setting device. On the other hand, in the printer 100 of the first exemplary embodiment, when the print mode is set to the high-resolution mode, the output density U' is set to 510, which is double the output density U' in the low-resolution mode. However, the output density U' may be determined by a method other than this.

For example, if surface tension of ink varies with ink colors because of the difference of components contained in ink for each print color, the dot size also varies depending on ink colors even if the same amount of ink is ejected onto a sheet. Thus, the output density U' may be set to a value corresponding to a print color of the output image data.

When the output density U' is set to a value corresponding to a print color of the output image data, the binarization executed at S140 of the above halftoning (FIG. 3) will be described with reference to a flowchart of FIG. 13. This binarization is different from the binarization of the first embodiment (FIG. 4) in that the process at S365 is performed instead of the processes at S360 to S380. Similar processes (S310 to 350 and S390 to S430) are designated by similar numerals, and thus the description thereof can be omitted for the sake of brevity.

In the binarization process of the exemplary embodiment, at S365, the output density U' is determined based on Table 1 below. For example, assuming that the print mode of the printer 100 is set to the high-resolution mode and the print color represented by the variable f is black (K), the value of the output density U' is 520. Thus, the value of the output density U' is determined in accordance with the print mode and the print color.

TABLE 1

| | Output density U' | | | |
|---|---|---|---|---|
| | K | C | M | Y |
| Low-resolution mode | 260 | 260 | 255 | 255 |
| High-resolution mode | 520 | 520 | 510 | 510 |

Figure 13:
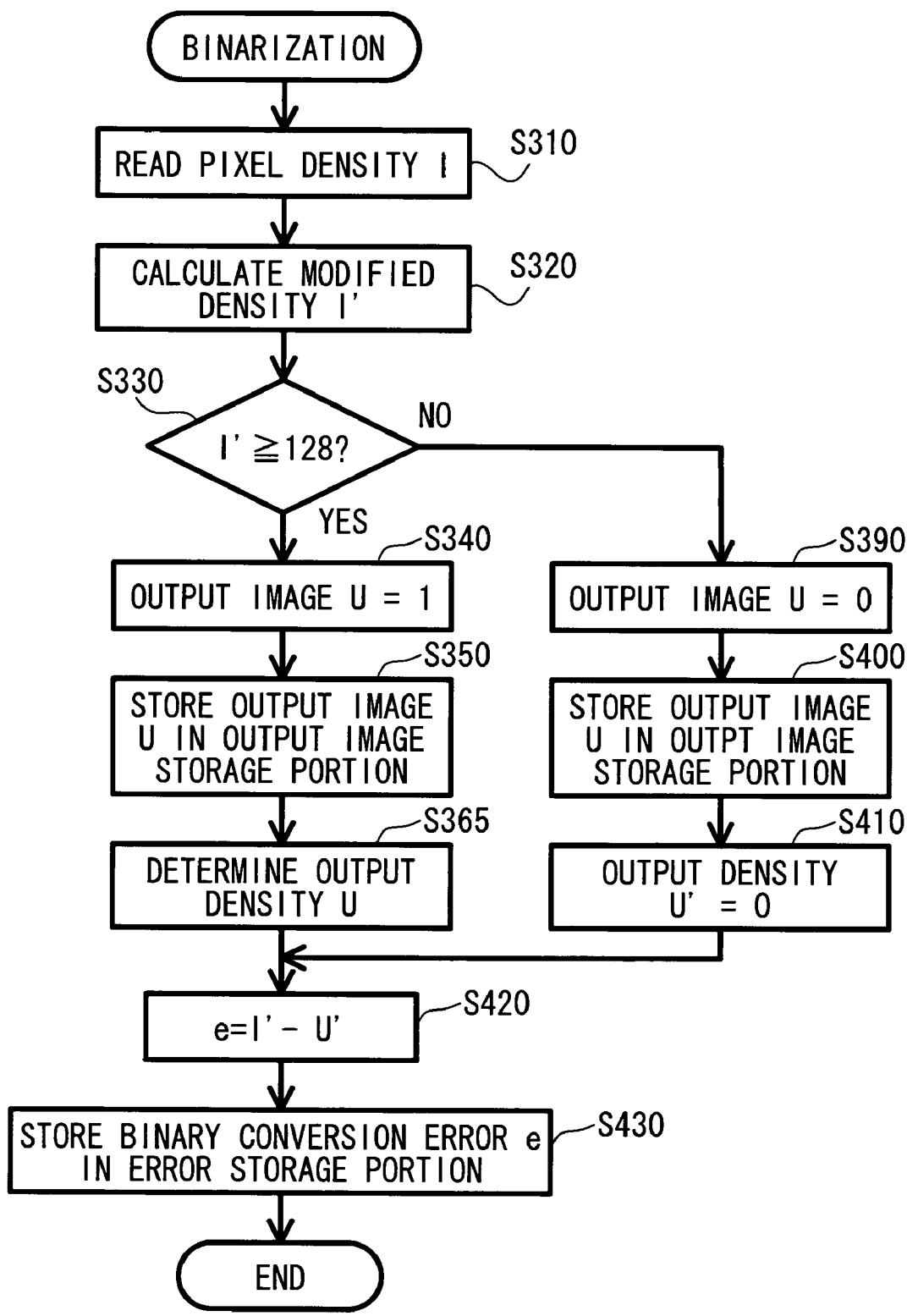
FIG. 13 is a flowchart of a binarization process as a modification.

According to the binarization process shown in FIG. 13, a reduction in color reproduction can be prevented even when the dot size to be formed on the sheet varies according to ink colors. In the binarization process shown in FIG. 12, the process as S365 functions as an output level value setting device.

On the other hand, in the printer 100 of the first exemplary embodiment, the output densitly U is represented by one (1) or zero (0) of the two values (binarized) according to whether the modified density I' is greater than the threshold value, however, the invention is not limited to this process. As long as the printing portion 140 is constructed so as to form dots in a plurality of sizes, the output image U may be represented by three or more values in accordance with the dot size. Specifically, assuming that the printing portion 140 is capable of forming dots of three different sizes of large, medium and small size, three kinds of threshold values are prepared (T1>T2>T3). For example, when the modified density I' is greater than or equal to T1, a large-sized dot is outputted. When the modified density I' is under T1 and greater than or equal to T2, a medium-sized dot is outputted. When the modified density I' is under T2 and greater than equal to T3, a small-sized dot is outputted. When the modified density I' is under T3, no dot is outputted. Even in this case, the output density U' used for calculating the binary conversion error e is set to a value corresponding to a size ratio of a dot size (ink quantity) with respect to a pixel size of the output image. For example, in the low-resolution mode, the output density U' is 64 for the small-sized dots (5 pl ink droplets), 128 for the medium-sized dots (10 pl ink droplets), and 255 for the large-sized dots (20 pl ink droplets). In the high-resolution mode, the output density U' is 128 for the small-sized dots, 255 for the medium-sized dots, and 510 for the large-sized dots. In this manner, the density as an entire output image represented by the output image data can be made appropriate.

Figure 14:
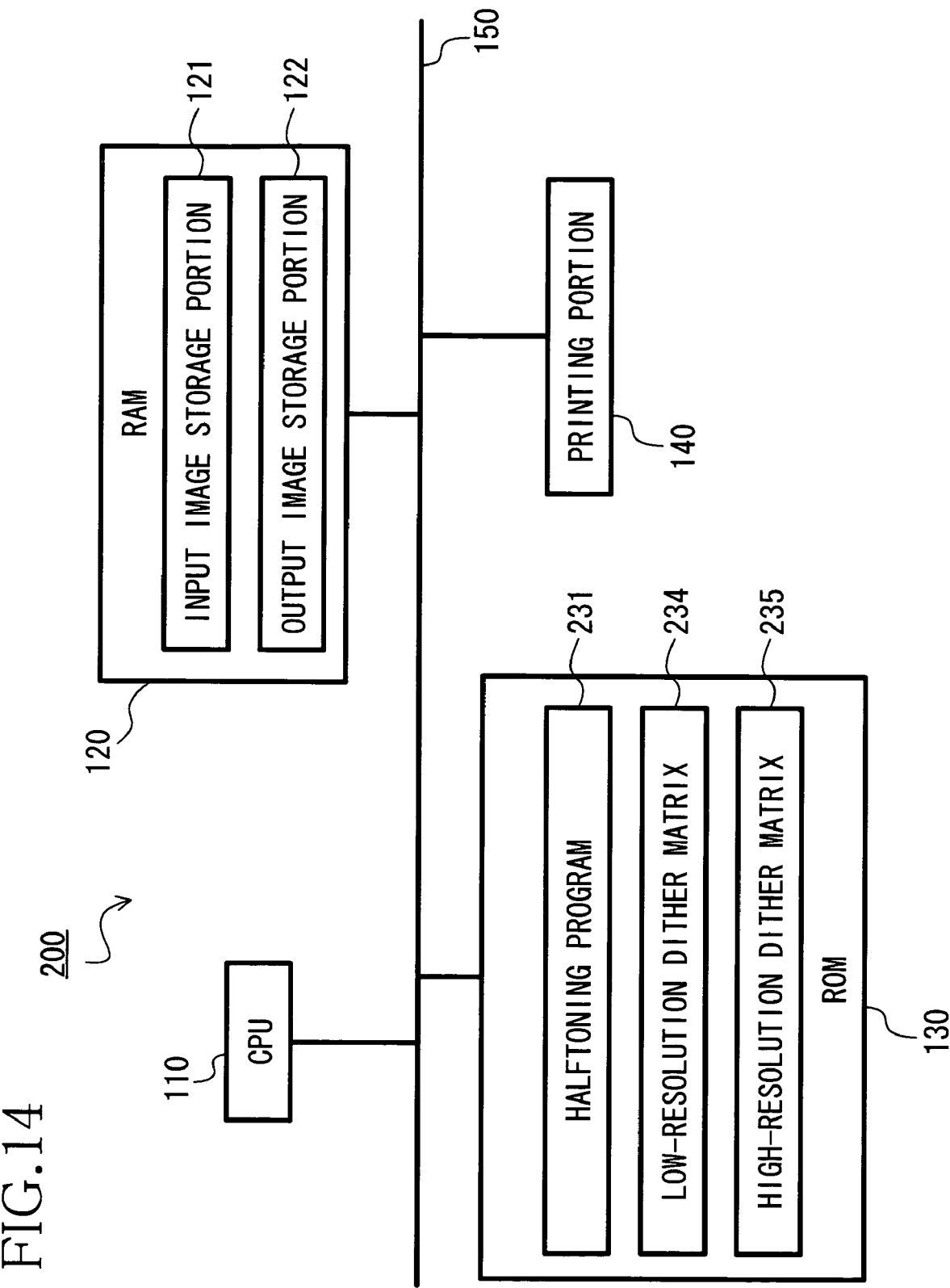
FIG. 14 is a block diagram of a general structure of a printer according to a second exemplary embodiment of the invention.

FIG. 14 is a block diagram of a general structure of a printer 200 according to a second exemplary embodiment of the invention. As shown in FIG. 14, the printer 200 is different from the printer 100 shown in FIG. 1 in the following three points. In FIG. 14, it is noted that elements similar to or identical with those of the printer 100 in the first embodiment are designated by similar numerals. Thus, the description thereof can be omitted for the sake of brevity.

1: Instead of the halftoning program 131 of the first embodiment, the ROM 130 stores a halftoning program 231, which is different in some process from the halftoning program 131 of the first embodiment. Specifically, in the halftoning process (FIG. 3) executed in accordance with the halftoning program 131 of the first embodiment, input image data of 256 levels is binarized by the error diffusion to generate output image data. On the other hand, in a halftoning process (FIG. 17) executed in accordance with the halftoning program 231 of the second embodiment, input image data of 16 levels (a multilevel ranging from zero (0) to 15) is binarized by dithering to generate output image data. In the second embodiment, the input image data of 16 levels is an example for convenience of description. As in the case of the first embodiment, the method of the second embodiment can be applied to the input image data of 256 levels.

Figure 17:
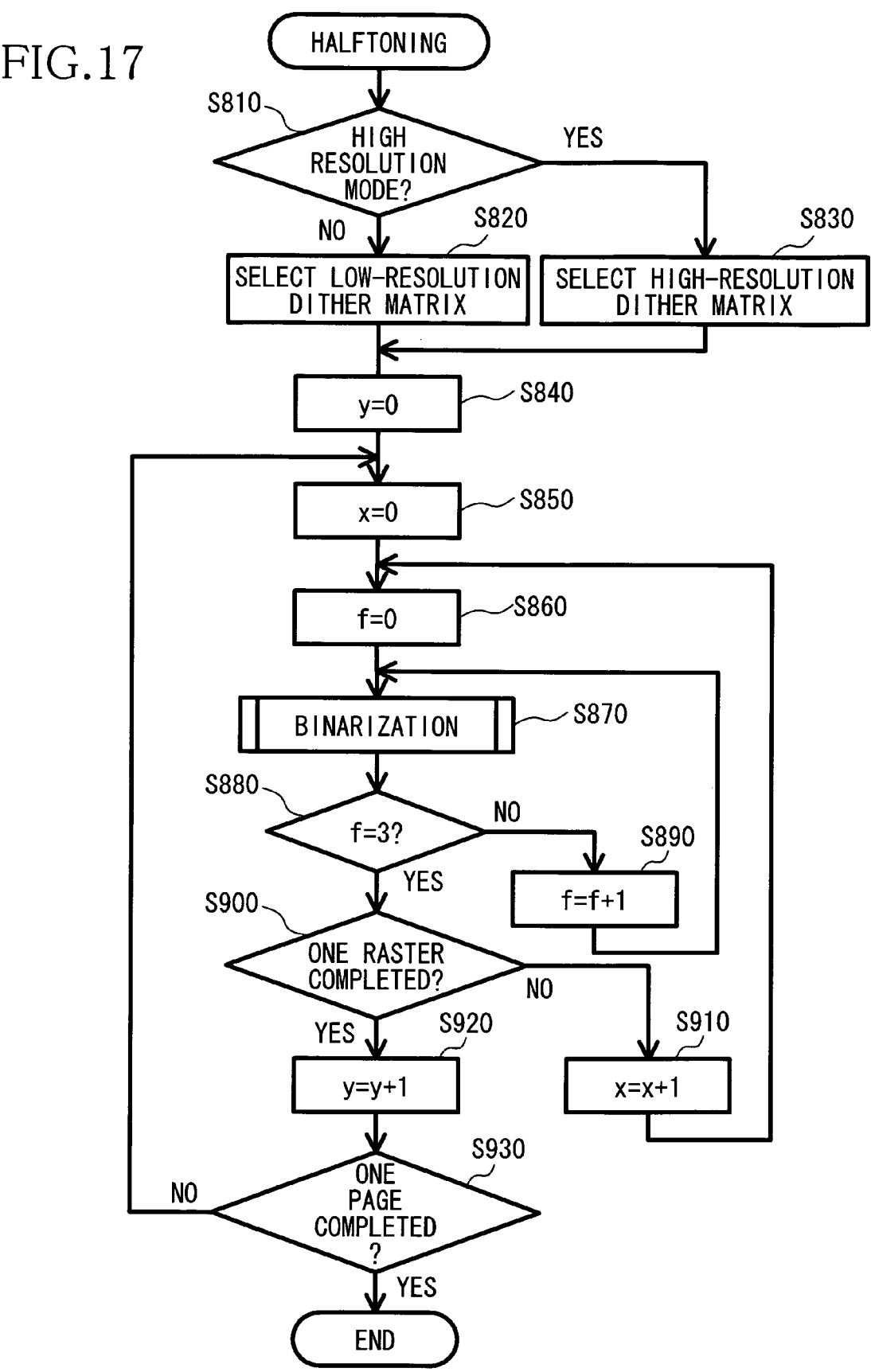
FIG. 17 is a flowchart of halftoning according to the second exemplary embodiment of the invention.

2: Instead of the error distribution matrix 132 and the threshold value 133 of the first embodiment, the ROM 130 stores a low-resolution dither matrix 234 and a high-resolution dither matrix 235 as information used in the halftoning process (FIG. 17). As shown in FIG. 15, the low-resolution dither matrix 234 stores threshold values T ranging from 1 to 16 in 16 cells comprised of four rows and four columns, and is conventionally used as a dither matrix for binarizing input image data of 16 levels by dithering. On the other hand, as shown in FIG. 16, the high-resolution dither matrix 235 stores threshold values T ranging from 1 to 32 in 32 cells comprised of four rows and eight columns, and is used for binarizing input image data of 32 levels by dithering.

3: The error storage portion 123 is not allocated in the RAM 120 because it is not necessary for dithering.

A halftoning process executed by the CPU 111 in accordance with the halftoning program 231 stored in the ROM 130 will be described with reference to FIG. 17. When the halftoning is started, it is determined whether the print mode of the printer 200 is set to the high-resolution mode in S810.

When it is determined that the print mode is not set to the high-resolution mode at S810 (namely, the print mode is set to the low-resolution mode), the flow goes to S820, and the low-resolution matrix 234 (FIG. 15) stored in the ROM 130 is selected as a dither matrix used for binarization described later (S870). Then, the flow goes to S840.

On the other hand, when it is determined that the print mode is set to the high-resolution mode at S810, the flow goes to S830, and the high-resolution dither matrix 235 (FIG. 16) stored in the ROM 130 is selected as a dither matrix used for the binarization (S870). Then, the flow goes to S840.

At S840 and S850 respectively, values of variables x and y are set to zero (0), which is an initial value. The variables x and y are used to determine a location of a pixel to be subjected to a binarization process, i.e., the location of a subject pixel.

At S860, a value of a variable f is set to zero (0). The variable f is used to determine a print color of input image data to be processed. As is the case with the first embodiment, values of the variable f are 0 for black (K), 1 for cyan (C), 2 for magenta (M), and 3 for yellow (Y).

At S870, a binarization process is executed for input image data whose print color is indicated by the variable f, of input image data sets stored in the input image storage portion 121. In the binarization process, the subject pixel (x, y) in the input image data is binarized to determine a corresponding output image U. The binarization process will be described later in detail.

At S880, it is determined whether the value of the variable f reaches 3. If it is determined that the value of the variable f does not reach 3 (namely, the variable f is any number from 0 to 2), the flow goes to S890, and one (1) is added to the value of the variable f to change the print color of the input image data to be binarized, and then the flow returns to S870.

On the other hand, when it is determined that the value of the variable f reaches 3, the flow goes to S900. That is, the flow is designed to go to S900 after the binarization process (S870) as to the input image data for each print color.

At S900, it is determined whether a binarization for one raster (one line) has been completed. That is, it is determined whether a binarization in the main scanning direction (x direction) has been completed.

When it is determined that the binarization for one raster is not completed at S900, the flow goes to S910, and one (1) is added to the value of the variable x to move the subject pixel position x, by one pixel (or column), in the main scanning direction. The flow returns to S860 and the steps subsequent to S860 are performed again.

On the other hand, when it is determined that the binarization for one raster has been completed at S900, the flow goes to S920, and one (1) is added to the value of the variable y to move the subject pixel position y, by one line, in the sub-scanning direction (in the y-axis direction).

At S930, a determination is made as to whether a binarization for one page has been completed. When it is determined that the binarization for one page is not completed at S930, the flow returns to S850 and the steps subsequent to S850 are performed again. On the other hand, when it is determined that the binarization for one page has been completed at S930, the halftoning ends. By executing the above-mentioned halftoning, output image data as to each print color is generated in the output image storage portion 122.

Figure 18:
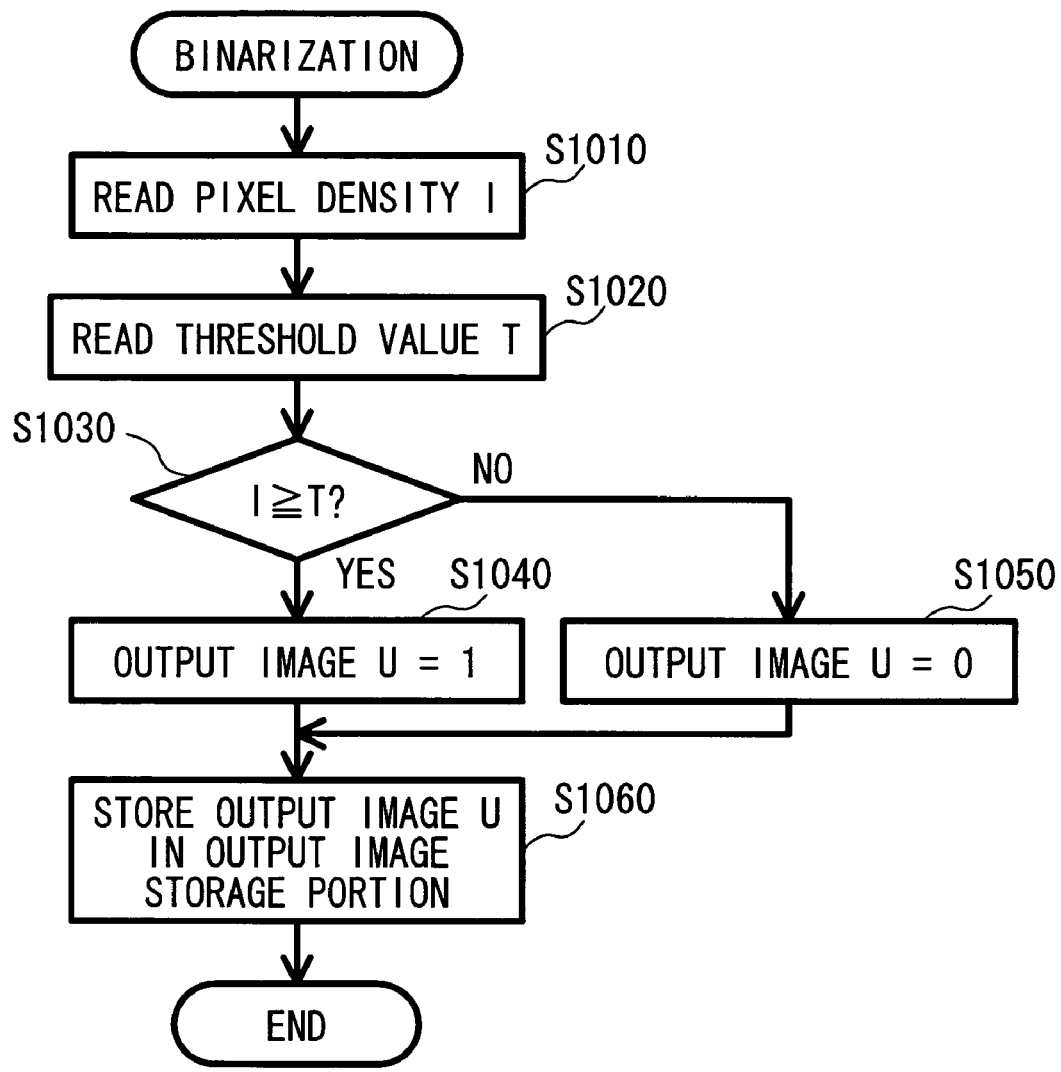
FIG. 18 is a flowchart of a binarization process according to the second exemplary embodiment of the invention.

The following is a description of a binarization process executed at S870 of the above halftoning (FIG. 17) with reference to FIG. 18. The binarization process in this exemplary embodiment is different from the conventional method in that a dither matrix is changed according to whether the print mode of the printer 200 is set to the high-resolution mode or the low-resolution mode in processes at S810 to S830 of the halftoning (FIG. 17).

When the binarization process is started, a pixel density $I (0 \leq I \leq 15)$ of the subject pixel (x, y) in the input image data of the print color indicated by the variable f at S1010 is read. At S1020, a threshold value T corresponding to the subject pixel (x, y) in the dither matrix selected during the processes at S810 to S830 of the halftoning (FIG. 17) is read.

At S1030, it is determined whether the pixel density I read at S1010 is greater than or equal to the threshold value T read at S1020. When it is determined that the pixel density I is greater than or equal to the threshold value T at S1030, the flow goes to S1040, the output image U of the print color represented by the variable f as to the subject pixel (x, y) is set to 1, and the flow goes to S1060.

On the other hand, when it is determined that the pixel density I is not greater than or equal to the threshold value T (that is, it is under the threshold value T) at S1030, the flow goes to S1050, the output image U of the print color represented by the variable f as to the subject pixel (x, y) is set to zero (0), and the flow goes to S1060.

At S1060, the value of the output image U for the print color represented by the variable f is stored in the output image storage portion 122. Thus, when the print mode of the printer 200 is set to the high-resolution mode, the binarization (FIG. 18) is performed using the high-resolution dither matrix 235 intended for input image data of thirty two (32) levels, so that the number of dots of the output image is decreased.

In the printer 200 of this exemplary embodiment, the processes at S810 to S830 in the halftoning process (FIG. 17) function as a dither matrix selecting device, and the processes at S1030 to S1050 in the binarization process (FIG. 18) function as a determining device.

As described above, the printer 200 of this exemplary embodiment uses a dither matrix corresponding to the ratio of dot size to pixel size of the output image. Thus, according to the printer 200, similar with the printer 100 of the first exemplary embodiment, the density of an entire image represented by output image data can be made adequate even when the dot size is greater than the pixel size of the output image. In addition, as is the case with the printer 100 of the first exemplary embodiment, there is no need to reduce the pixel density I, and loss of levels of multi-level input image data can be prevented.

Although the invention has been described with reference to the exemplary embodiments, it is to be understood that the invention is not restricted to the particular forms shown in the foregoing exemplary embodiments. Various modifications and alternations can be made thereto without departing from the scope of the invention. The invention can be applied to other equipment or devices, such as copying machines and personal computers, as well as printers.

What is claimed is:

1. An image processing apparatus that converts multilevel input image data into multilevel output image data having fewer levels than the multilevel input image data and used in an image output device, comprising:

a determining device that determines an output level value of a subject pixel in the output image data based on a comparison between an input level value of the subject pixel in the input image data and a threshold value corresponding to the subject pixel in a dither matrix;

a mode setting device that adjusts the image output device to operate in one of a plurality of image output modes each of which outputs output image data at a different resolution;

a storage device that stores a plurality of dither matrices of varying sizes according to representable levels in association with the plurality of image output modes; and a dither matrix selecting device that selects a dither matrix of the plurality of dither matrices stored in the storage device corresponding to the one of the plurality of image output modes set by the mode setting device as a dither matrix directly used by the determining device, wherein:

when a predetermined image output mode is set by the mode setting device, the dither matrix selecting device selects a dither matrix that has a larger number of levels than a number of levels of the input image data, and the predetermined image output mode is an image output mode for outputting output image data having a highest resolution.

2. An image processing apparatus that converts multilevel input image data into multilevel output image data having fewer levels than the multilevel input image data and used in an image output device, comprising:

a determining device that determines an output level value of a subject pixel in the output image data based on a comparison between an input level value of the subject pixel in the input image data and a threshold value corresponding to the subject pixel in a dither matrix;

a mode setting device that adjusts the image output device to operate in one of a plurality of image output modes each of which outputs output image data at a different size ratio of a dot size to a pixel size of an output image;

a storage device that stores a plurality of dither matrices of varying sizes according to representable levels in association with the plurality of image output modes; and a dither matrix selecting device that selects a dither matrix of the plurality of dither matrices stored in the storage device corresponding to the one of the plurality of image output modes set by the mode setting device as a dither matrix directly used by the determining device, wherein:

when a predetermined image output mode is set by the mode setting device, the dither matrix selecting device selects a dither matrix that has a larger number of levels than a number of levels of the input image data, and the predetermined image output mode is an image output mode for outputting output image data having a greatest size ratio of the dot size.

3. An image processing method of converting multilevel input image data into multilevel output image data having fewer levels than the multilevel input image data, the method comprising:

comparing an input level value of a subject pixel in the input image data and a threshold value corresponding to the subject pixel in a dither matrix with a computer processor;

determining an output level value of the subject pixel in the output image data based on a result of comparing with the computer processor;

storing a plurality of dither matrices of varying sizes in a storage device;

selecting a dither matrix of the plurality of dither matrices stored in the storage device corresponding to a resolution of the output image data as a dither matrix directly used to determine the output level value when the output image data is outputted at the resolution selected from a plurality of resolutions with the computer processor; and selecting a dither matrix that has a larger number of levels than a number of levels of the input image data if the output image data is outputted at a predetermined resolution of the plurality of resolutions with the computer processor, the predetermined resolution being a resolution for outputting output image data having a highest resolution.

4. An image processing method of converting multilevel input image data into multilevel output image data having fewer levels than the multilevel input image data, the method comprising:

comparing an input level value of a subject pixel in the input image data and a threshold value corresponding to the subject pixel in a dither matrix with a computer processor;

determining an output level value of the subject pixel in the output image data based on a result of the comparing with the computer processor;

storing a plurality of dither matrices of varying sizes in a storage device;

selecting a dither matrix of the plurality of dither matrices stored in the storage device corresponding to a size ratio of a dot to a pixel of the output image data as a dither matrix directly used to determine the output level value when the output image data is outputted at the size ratio selected from a plurality of size ratios of dots to pixels of an output image with the computer processor; and selecting a dither matrix that has a larger number of levels than a number of levels of the input image data if the output image data is outputted at a predetermined size ratio of the plurality of size ratios with the computer processor, the predetermined size ratio being a size ratio for outputting output image data having a greatest size ratio of the dot size.

5. A non-transitory computer readable storage medium that stores an image processing program configured to operate a computer to convert multilevel input image data into multilevel output image data having fewer levels than the multilevel input image data, the program comprising instructions to:

determine an output level value of a subject pixel in the output image data based on a comparison between an input level value of the subject pixel in the input image data and a threshold value corresponding to the subject pixel in a dither matrix;

store a plurality of dither matrices of varying sizes; and select a dither matrix of the plurality of dither matrices that are stored corresponding to a resolution of the output image as a dither matrix directly used to determine the output level value when the output image data is outputted at a resolution selected from a plurality of resolutions, having a larger number of levels than a number of levels of the input image data if the output image data is outputted at a predetermined resolution of the plurality of resolutions, the predetermined resolution being a resolution for outputting output image data having a highest resolution.

6. A non-transitory computer readable storage medium that stores an image processing program configured to operate a computer to convert multilevel input image data into multilevel output image data having fewer levels than the multilevel input image data, the program comprising instructions to:

determine an output level value of a subject pixel in the output image data based on a comparison between an input level value of the subject pixel in the input image data and a threshold value corresponding to the subject pixel in a dither matrix;

store a plurality of dither matrices of varying sizes; and select a dither matrix of the plurality of dither matrices that are stored corresponding to a size ratio of a dot to a pixel of the output image data as a dither matrix directly used to determine the output level value when the output image data is outputted at the size ratio selected from a plurality of size ratios, having a larger number of levels than a number of levels of the input image data if the output image data is outputted at a predetermined size ratio of the plurality of size ratios, the predetermined size ratio being a size ratio for outputting output image data having a greatest size ratio of the dot size.

* * * * *